United States Patent [19]

Fung

[11] Patent Number: 5,256,612
[45] Date of Patent: * Oct. 26, 1993

[54] METHOD FOR TREATING A CATALYST

[75] Inventor: Shun C. Fung, Bridgewater, N.J.

[73] Assignee: Exxon Research and Engineering Company, Florham Park, N.J.

[*] Notice: The portion of the term of this patent subsequent to Apr. 21, 2009 has been disclaimed.

[21] Appl. No.: 845,578

[22] Filed: Mar. 4, 1992

Related U.S. Application Data

[63] Continuation-in-part of Ser. No. 551,378, Jul. 12, 1990, Pat. No. 5,106,798.

[51] Int. Cl.$^5$ .................. B01J 38/44; B01J 29/38; B01J 29/12; C10G 35/085
[52] U.S. Cl. ..................... 502/37; 208/140; 502/50; 502/53; 502/66; 502/74; 502/230
[58] Field of Search ............ 502/37, 66, 74, 230, 502/53, 50; 208/140

[56] References Cited

U.S. PATENT DOCUMENTS

| | | | |
|---|---|---|---|
| 3,069,352 | 12/1962 | Mosesman | 208/140 |
| 3,518,207 | 6/1970 | Hagy et al. | 252/466 |
| 3,904,510 | 9/1975 | Sinfelt et al. | 208/140 |
| 3,939,062 | 2/1976 | Sinfelt et al. | 208/140 |
| 3,998,755 | 12/1976 | Hayes | 208/140 |
| 4,354,925 | 10/1982 | Schorfheide | 208/140 |
| 4,477,590 | 10/1984 | Kresge et al. | 502/334 |
| 4,493,764 | 1/1985 | Kresge et al. | 208/138 |
| 4,810,683 | 3/1989 | Cohn et al. | 502/37 |
| 4,824,816 | 4/1989 | Trowbridge et al. | 502/66 |
| 4,835,129 | 5/1989 | Travers et al. | 502/37 |
| 4,855,269 | 8/1989 | Mohr | 502/37 |
| 4,937,215 | 6/1990 | Murakawa et al. | 208/140 |
| 5,106,798 | 4/1992 | Fung | 502/37 |

FOREIGN PATENT DOCUMENTS

| | | |
|---|---|---|
| 0309139 | 3/1989 | European Pat. Off. |
| 2642330 | 8/1990 | France |
| 8804574 | 6/1988 | PCT Int'l Appl. |
| 1395-357-A | 5/1988 | U.S.S.R. |
| 557008 | 5/1946 | United Kingdom ............ 502/53 |

Primary Examiner—Paul E. Konopka
Attorney, Agent, or Firm—Estelle C. Bakun

[57] ABSTRACT

A method for regenerating a Group VIII noble metal catalyst which has been contaminated with coke during a reforming process. The method comprises (a) burning off the coke from the catalyst, (b) redispersing the noble metal on the surface of the catalyst support by contacting the catalyst with halogen gas and carbon dioxide, and (c) chemically reducing the catalyst. The presence of carbon dioxide in the redispersing step improves the activity of the regenerated catalyst.

16 Claims, No Drawings

METHOD FOR TREATING A CATALYST

CROSS-REFERENCE TO COPENDING APPLICATION

This is a Continuation-in-Part application of copending application Ser. No. 551,378 filed Jul. 12, 1990, now U.S. Pat. No. 5,106,798.

BACKGROUND OF THE INVENTION (A) Field of the Invention

This invention relates to a method for treating (regenerating and reactivating, or activating) Group VIII noble metal-containing coke-contaminated catalysts and fresh catalysts commonly used in hydrocarbon conversion processes, especially catalytic reforming. The catalysts which can be treated according to the present invention will contain a support, more preferably, the catalysts will contain both a support and a binder.

(B) Description of the Prior Art

Several materials have been employed as hydrocarbon conversion catalysts in processes such as reforming, catalytic dewaxing, alkylation, oxidation and hydrocracking. Examples of catalysts useful for these processes include materials consisting of a catalytically active Group VIII metal, typically platinum, and optionally rhenium or tin, carried on or impregnated into a support. Conventionally this support is alumina although more recently zeolites have been employed, for example type X and Y zeolites. Type. L zeolites have also been suggested as suitable supports, especially cation exchanged type L zeolites.

Among the hydrocarbon conversion processes, catalytic reforming in the presence of hydrogen is one of the most important. Catalytic reforming is a refinery process designed to increase the octane number of naphtha. Typically the naphtha feed is passed over a platinum-containing catalyst supported on a refractory material under reforming conditions, for example, elevated temperatures and pressures, well-known in the industry in the presence of hydrogen gas with a hydrogen to hydrocarbon mole ratio of about 2 to 20. The reforming process involves several different types of reactions including isomerization, dehydrogenation of naphthenes to aromatics, dehydrogenation of paraffins to olefins, dehydrocyclization of paraffins and olefins to aromatics, hydrocracking of paraffins to gaseous hydrocarbons such as methane or ethane, and inevitably the formation of coke, the latter being deposited on the catalyst. Ideally the reforming process minimizes the hydrocracking of paraffins and maximizes the reactions leading to the formation of more valuable products, particularly dehydrocyclization and dehydrogenation to aromatics.

During the reforming process the activity of the catalyst gradually declines due to the build-up of coke, until eventually it requires regenerating and reactivating. There are several steps required for the regeneration and reactivation of the catalyst.

The first step is the regeneration of the catalyst by removing the deposited coke. Typically the coke is removed by heating the catalyst in the presence of dilute oxygen at a flame-front temperature of 430° C. to 540° C. Some water vapor may be present in this regeneration step. U.S. Pat. No. 4,354,925 discloses using a gaseous mixture of oxygen and carbon dioxide, the presence of this gas mixture permitting a higher oxygen concentration to be used in the burn gas, thereby enabling the coke burn off to be completed more quickly. This regeneration step may be preceded by flushing the system with, for example, hydrogen or nitrogen gas to remove residual hydrocarbons.

The high temperatures used in the above regeneration lead to agglomeration of the metal particles and, when the support is a zeolite, to removal of the metal particles from the zeolite channels, and hence to deactivation of the catalyst. Thus, after the coke burn off, the catalyst is usually subjected to a reactivation step in which the metal particles are redispersed on the support material. Typically this involves treating the catalyst with chlorine-containing gas or a chlorine-liberating gas usually in the presence of oxygen and water vapor, and is often referred to as the oxychlorination step.

Subsequently the catalyst is treated with a reducing gas, typically hydrogen, to reduce the metal chloride formed in the above oxychlorination step to elemental metal particles. The catalyst is then ready for reuse in the reforming process.

However, it has been found that, particularly for platinum-containing zeolite catalysts, the above regeneration and reactivation process often does not reactivate the catalyst to activation levels at or near those exhibited by the fresh catalyst.

SUMMARY OF THE INVENTION

The present invention relates to an improved process for treating (regenerating and reactivating, or activating) Group VIII noble metal-containing coke-contaminated catalysts and fresh catalysts. Accordingly, the invention provides a method for treating catalysts comprising a Group VIII noble metal and a support, more preferably a Group VIII noble metal, a support and a binder. The method comprises:

(a) removing substantially all of the coke from the catalyst when said catalyst is a coke-contaminated deactivated catalyst;

(b) redispersing the noble metal(s) on the support;

(c) chemically reducing the catalyst; the redispersing step (b) being carried out by contacting the catalyst in a reaction vessel with a halogen or halide-containing gas and carbon dioxide gas, the amount of carbon dioxide being maintained at a partial pressure of at least 2 kPa in the reaction vessel substantially throughout the period in which the catalyst is in contact with the halogen or halide-containing gas.

We have found that the presence of carbon dioxide in the redispersing step of the catalyst's regeneration and reactivation, or activation process enhances the activity and hence the performance of the catalyst. A catalyst which has undergone the method according to the invention shows greater selectivity towards the formation of desired aromatic compounds in a naphtha reforming process and also exhibits greater longevity, i.e., will maintain sufficient activation levels for a longer period of time than catalysts regenerated according to conventional techniques. The method according to the invention has particular benefits for the regeneration of Group VIII-containing catalysts supported by a zeolite material.

Applicant has also found that treatment, regeneration and/or reactivation, of Group VIII noble metal-containing fresh and coke-contaminated catalysts, which treatment includes a reduction step which is carried out in less than 0.05 kPa partial pressure, preferably less than 0.025 kPa partial pressure, of carbon dioxide and carbon monoxide provides improved catalysts.

DETAILED DESCRIPTION OF THE INVENTION

In more specific embodiments of this invention described below the gaseous stream used in each step has a remaining percentage (which is not water, hydrogen, oxygen or a source of chlorine) of an inert gas such as helium, argon or nitrogen which will not interfere with the process. Preferably water is present in the gaseous stream of each step.

In general, the coke removal step (a) is carried out by contacting the coke-contaminated catalyst with a gaseous stream containing from 0 to 10% by volume water, preferably 0.5 to 5% by volume water, more preferably 1 to 3%, based on the total stream volume, and oxygen (usually in the form of an oxygen-containing gas such as air) at a temperature of from about 380° to 540° C. Preferably this first step is carried out at two temperatures, the first being at a lower temperature range of about 380° to 480° C., and the second being at a higher temperature range of about 480° to 520° C. The $O_2$ treatment at the lower temperature is preferably carried out for a longer time period than the second $O_2$ treatment. The exact time for heating will depend on the temperature employed but generally ranges from 1 to 10 hours or more. The amount of oxygen employed is generally from 0.1 to 25% by volume, preferably 0.2 to 15% by volume, more preferably from 0.5 to 12% of the gas stream.

The redispersing step (b) is carried out using a halogen or halide-containing gas (hereinafter generally referred to as "halogen gas"), and carbon dioxide. The source of the halogen gas may be, for example, chlorine gas, carbon tetrachloride or hydrogen chloride. The halogen gas is usually mixed with oxygen and preferably also with water vapor, and this redispersion step is commonly referred to as the oxychlorination step. Examples of suitable oxychlorination steps are:

(i) heating the catalyst at a temperature from about 400° to about 530° C. for up to 10 hours in the presence of a gaseous stream comprising from zero to 10% by volume of water, and a source of chlorine, in the presence of oxygen;

(ii) heating the catalyst at a temperature from about 400° to about 530° C. for up to 10 hours in the presence of gaseous stream comprising from zero to 10 by volume of water, and a source of chlorine, in the presence of hydrogen (except when HCl is the source of chlorine, the hydrogen is optional), and subsequently heating the catalyst at a temperature from about 400° to 540° C. for up to 7 hours in the presence of a gaseous stream comprising 0 to 10% by volume oxygen and essentially no water, or for up to 5 hours in the presence of gaseous stream comprising 0 to 10% by volume oxygen and from greater than zero to 10% by volume of water;

(iii) combining steps (ii) and (i) above in that order without carrying out the subsequent heating in step (ii);

(iv) heating the catalyst at a temperature from about 400° to about 530° C. for up to 10 hours in the presence of a gaseous stream comprising from zero to 10% by volume of water and an effective amount of chlorine.

The source of carbon dioxide may be, for example, pure carbon dioxide gas fed directly into the reactor in which the catalyst is being regenerated, or a mixture of carbon dioxide and inert gases. The carbon dioxide source may also be mixed with the other gases employed in the oxychlorination step, typically halogen gas, oxygen and optionally water vapor. Alternatively the source of carbon dioxide may be a carbon dioxide-liberating compound, which may be gaseous, liquid or solid, although is preferably gaseous to facilitate its introduction into the reactor.

In order to obtain an improved catalytic performance, the carbon dioxide must be maintained at a partial pressure of at least 2 kPa in the reactor substantially throughout the period in which the catalyst is in contact with the halogen gas. Conveniently the introduction of the carbon dioxide gas is commenced at approximately the same time as the introduction of the halogen gas, and is terminated at approximately the same time as the termination of the input of halogen gas. The carbon dioxide may be fed into the reactor as, for example, a continuous flow of gas or as pulses of gas, provided the minimum concentration is maintained. Preferably a continuous flow is used. The carbon dioxide gas passing out of the reactor can be recycled and fed back into the reactor, thus providing an economical reactivation process.

Preferably the partial pressure of carbon dioxide in the reactor during the oxychlorination step (i.e., when halogen gas is present) is from 2 kPa to 35 kPa, more preferably from 4 kPa to 15 kPa. It is preferred to input carbon dioxide gas into the reactor as a mixture of carbon dioxide gas with inert gases, for example nitrogen or helium.

While the present invention is not to be limited to any particular theory, it is thought the presence of carbon dioxide may reduce the extent of reactions between the halogen gas and the binder which may be present in the catalyst, for example alumina, and thereby inhibits the formation of metal halides, for example platinum chloride, on the binder material. Thus for platinum-L zeolite catalysts this leads to a better distribution of the platinum particles within the L zeolite channels.

After completion of the oxychlorination step it is generally preferred to remove any excess halogen and to stabilize the metal particles on the support surfaces. Typically this is achieved by continuing to contact the catalyst with oxygen after terminating the flow of halogen gas. For example, by heating the catalyst at a temperature for up to 7 hours, preferably from 0.5 to 3 hours, in the presence of a gaseous stream comprising 0 to 10% by volume oxygen and essentially no water, or for up to 5 hours, preferably from 0.5 to 1.5 hours, in the presence of a gaseous stream comprising 0 to 10% by volume oxygen and from greater than zero to 10% by volume of water. This additional step is not required when above redispersion step (ii) is carried out as it is already included within that step. If desired the flow of carbon dioxide may be continued during the oxygen stabilization step, after which the flow is stopped.

After oxychlorination the catalyst needs to be chemically reduced to convert the noble metal halide formed during oxychlorination to the elemental metal. Generally this reduction is achieved by contacting the catalyst with a reducing gas such as hydrogen at elevated temperatures, optionally in the presence of water vapor. For example, the catalyst is heated at a temperature of from about 350° to about 530° C. for up to 10 hours in the presence of a gaseous stream comprising from zero to 10% by volume of water, and a source of hydrogen. The concentration of hydrogen is generally 0.5 to 100% by volume, preferably 2 to 20%.

We have also found that the presence of carbon dioxide or carbon monoxide during the reduction step can adversely affect the performance of the resulting catalyst. Therefore the reduction is preferably carried out in the presence of a minimal amount, if any, of carbon dioxide and carbon monoxide. The amount of carbon dioxide and carbon monoxide gases present during the hydrogen reduction step should be no more than 0.05 kPa partial pressure, preferably no more than 0.025 kPa partial pressure. It is especially preferred to eliminate carbon dioxide and carbon monoxide prior to the reduction step when the catalyst support is an L zeolite. If, after the oxychlorination step, the system is flushed with oxygen as described above, then this should effect removal of the carbon-containing gases. However, it is also preferred to remove any remaining oxygen prior to the introduction of the hydrogen gas. Therefore, whether or not the oxygen treatment has been carried out, it is preferred to purge the system with an inert gas, for example nitrogen or helium, prior to the commencement of the reduction step.

Small amounts of $CO_2$ and CO, i.e., greater than 0.05 kPa are often present in the reactor system if special consideration is not taken to purge them out. These small amounts of $CO_2$ and CO are the result of $CO_2$ and CO accumulation in dead legs (a section of a pipe with a connection to the reactor at one end and closed at the other end by a valve) during the coke burn step. Special considerations such as pressurization and depressurization of the reactor system, or opening up the valves in the dead legs, are needed to facilitate the purging of $CO_2$ and CO to below 0.05 kPa. Additionally, if driers are used during the coke burning step, $CO_2$ and CO are trapped by the driers and subsequent drier regeneration will release them. Therefore, special considerations must be made to ensure that during drier regeneration the reactor is isolated and the associated piping is purged out by, e.g., the above-mentioned methods to remove $CO_2$ and CO before chemically reducing the catalyst with hydrogen. Small amounts of $CO_2$ can also be introduced to the reactor system during the heating of a fresh catalyst. High surface area supports such as $Al_2O_3$ and L zeolite adsorb $CO_2$ from exposure to air and in particular alkaline (e.g., K, Na, Rb) and alkaline earth (e.g., Ba, Sr, Ca) L zeolites adsorb $CO_2$ due to its alkaline property. Special considerations in the purging out f $CO_2$ to below 0.05 kPa and preferably to below 0.025 kPa, using the above-mentioned methods, before the reduction step to avoid catalyst deactivation must be made.

When removing the carbon mono- and dioxide before the reduction step by pressure-depressure cycles an inert gas such as nitrogen which is free of carbon mono- and dioxide is used. By pressurizing the reactor with the inert gas, the concentrations of carbon mono- and dioxide are reduced by dilution. This method may be coupled with the gas purge as described above.

In all the steps of the catalyst regeneration and reactivation according to the invention, the pressure of the reactor is generally from 0.1 to 2 MPa, conveniently at atmospheric pressure. The gas flow rates are generally in the range of from about 1 to about 300 ml per gram of catalyst per minute.

The catalyst support may be, for example, an inorganic oxide such as alumina, titanium dioxide, zinc oxide, magnesium oxide, thoria, chromia and zirconia or the like, a zeolite, for example faujasite, mordenite, X, Y or L zeolites, a clay such as china clay, kaolin, bentonite, diatomaceous earth or other silicon based materials such as silica gel or silicon carbide, or a mixture of one or more of the above. Preferably, the support is alumina or a zeolite, more preferably a zeolite, and especially a type L zeolite.

Type L zeolites may be defined as synthetic zeolites which crystallize in the hexagonal system. They have channel-shaped pores undulating from about 7 to 13A in diameter and may occur in the form of cylindrical crystals with a mean diameter of at least 0.5 micron and an aspect ratio of at least 0.5 (as described, for example, in U.S. Pat. No. 4,544,539, the disclosure of which is incorporated herein by reference), as well as in other shapes and sizes. L zeolite typically have the general formula:

$$0.9\text{-}1.3\ M_{2/n}O : Al_2O_3 : xSiO_2 : yH_2O$$

where M represents an exchangeable cation, n represents the valency of M, y is any value from zero to about 9, and x is about 5.2 to about 6.9.

A more complete description of L zeolite is given in U.S. Pat. No. 3,216,789 the disclosure of which is incorporated herein by reference.

The type L zeolites are conventionally prepared such that M in the above formula is potassium. See, for example, U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, more preferably still, potassium, rubidium or cesium, and most preferably potassium. Optionally, the exchangeable cations may consist of mixtures of the above-named Group IA cations or mixtures of a Group IA cation and barium or calcium cations. These mixtures of cations may be achieved, for example, by treating the zeolite L with an aqueous solution containing, e.g., a rubidium and/or cesium salt and then washing to remove excess ions. This ion exchange treatment can be repeated to effect further ion exchange, although to a lesser degree.

The zeolite catalysts employed in processes of the present invention may be made by loading one or more Group VIII metals into the zeolite. Preferably, the zeolite is made into formed particles, e.g., pellets, extrudates, balls, pills, or the like, with an inert binder such as alumina, silica, or clays before loading. Alumina, especially gamma alumina, is a preferred binder. References in the present specification to the diameter of the catalyst particles should be understood as referring to the diameter of the formed particles, which preferably is about 1/32" to about ¼". Preferably, the metal is or includes platinum, typically about 0.3 to about 1.5% platinum by weight based on the weight of the zeolite, and is loaded into the zeolite by a process as disclosed in U.S. Pat. No. 4,568,656.

In the loading process of the '656 patent, the zeolite, typically in the pellet or matrix with the binder, is contacted with an aqueous loading solution containing a platinum salt and a non-platinum metal salt, to give a pH value between 8-12.5, aged to distribute the platinum salt within the pores of the zeolite, dried and then calcined.

The L zeolite catalysts may be made under varying pH levels, and we have found that the addition of carbon dioxide during the redispersing step of the regeneration and reactivation of the catalyst is particularly beneficial when platinum deposition on the L zeolite has been carried out at relatively low pH (around pH 8-9), rather than at higher pH levels, although some improved catalyst performance is also exhibited when the zeolite catalysts are prepared at these higher levels.

The Group VIII noble metals which are necessary for catalytic activity are those metals from Group VIII of the Periodic Table of Elements which are selected from osmium, ruthenium, rhodium, iridium, palladium and platinum. Preferably, the metals which are employed herein are platinum, rhodium or iridium, and most preferably platinum, and examples of suitable bimetallic combinations are platinum-iridium and platinum-palladium. The metals may be present in any combination desired. Rhenium, a Group VIIB metal, may also be present so long as at least one Group VIII noble metal is present, an example being platinum-rhenium.

The amount of Group VIII noble metal present in the catalyst will be an effective amount and will depend, for example, on required catalyst activity, ease of uniform dispersion, and the type of catalyst support. For zeolites, crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6%, preferably 0.1 to 3.5%, more preferably 0.1 to 2.5% and most preferably 0.2 to 1% by weight of the catalyst. Furthermore, for zeolites, the amount of metal present is generally from about 0.1 to 2.0% by weight of the catalyst if the average zeolite crystallite size parallel to the channels is greater than about 0.2 micron, and from about 1.0 to 6% by weight if the average zeolite crystallite size parallel to the channels is no greater than about 0.2 micron.

The Group VIII noble metals may be introduced on to the support by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced by an ion-exchange process, it is preferred to remove the residual acidity of the support material by treating the catalyst, which has previously been reduced by hydrogen, with an aqueous solution of an alkaline base such as potassium carbonate. This treatment will neutralize any hydrogen ions formed during the reduction of Group VIII noble metal ions by hydrogen.

The activation method according to the present invention can also be applied to fresh catalysts to improve the activity of the fresh catalyst in naphtha reforming processes. By "fresh catalyst" is meant a catalyst that has not yet been used in a naphtha reforming process and thus is not coke-contaminated. Thus in another aspect the present invention provides a method for activating a fresh catalyst comprising at least one Group VIII noble metal, a support and a binder, which method comprises:

(a) treating the catalyst in a reaction vessel with a halogen or halide-containing gas in the presence of carbon dioxide, and (b) chemically reducing the catalyst.

The preferred conditions and embodiments of this other aspect of the invention are as described above for the method for reactivating a coke-contaminated catalyst.

It has also been found that the reduction of the catalyst prior to its use in a reforming process, whether or not it has undergone activation or regeneration and reactivation, in the presence of carbon dioxide, is advantageously carried out in less than 0.05 kPa, preferably less than 0.025 kPa partial pressure of carbon dioxide and carbon monoxide, most preferably the reduction is carried out in the substantial absence (zero or amounts approaching zero) of these carbon-containing compounds. If a higher level of these gases is present then the activity of the catalyst during reforming is considerably reduced. This applies to the reduction of both fresh and regenerated catalysts.

Once the catalyst has been reduced it is beneficial not to expose the catalyst to carbon dioxide and carbon monoxide in an amount any greater than 0.05 kPa, preferably 0.025 kPa partial pressure before that catalyst is employed in a reforming process.

The invention will now be illustrated by the following examples. Unless otherwise specified, all parts and percentages are given by weight for solids and liquids, and by volume for gases. Gas compositions are described in terms of the main components; the remainder of the composition comprising an inert gas such as nitrogen or helium.

EXAMPLE 1

A catalyst was prepared as follows:

An L zeolite having a composition expressed in moles of pure oxide of 0.99 $K_2O : Al_2O_3 : 6.3 SiO_2 : xH_2O$ and having a cylindrical shape and an average particle size of about 2 to 2.5 microns was prepared by the technique described in Example 1 of U.S. Pat. No. 4,544,539. Thus, an alkaline synthesis gel was prepared by dissolving 23.4 g of aluminum hydroxide by boiling in an aqueous solution of 51.2 g potassium hydroxide pellets (86% pure KOH) in 100.2 g water to form Solution A. After dissolution any water loss was corrected. A separate solution, Solution B, was prepared by diluting 225 g colloidal silica (Ludox HS 40) with 195 g water. Solutions A and B were mixed for two minutes to form a gel, and just before the gel became fully stiff, 224 g thereof were transferred to a Teflon-lined autoclave, preheated to 150° C., and held at that temperature for 72 hours to bring about crystallization, after which the solid zeolite was separated out.

The zeolite was then formed in 1/16" extrudates using gamma alumina as a binder. 0.64 weight percent platinum was then loaded into the zeolite extrudates using Pt $(NH_3) Cl_2$ salt with an amount of KCl and KOH calculated according to the method disclosed in U.S. Pat. No. 4,568,656 to give an end loading pH value of 10.0.

The PT/KL zeolite was then calcined at 350° C. in a reactor at atmospheric pressure with a gas stream of 10% dry $O_2$ at a flow rate of 500 ml/min for 2 hours, after which 3% water was added to the gas stream and the treatment continued for a further 2 hours. The catalyst was then reduced with a gas stream of 10% $H_2$ and 3% $H_2O$ at a flow rate of 500 ml/min for 3 hours at a temperature of 350° C. The resulting fresh catalyst is designated as Catalyst A.

The deactivation produced by coke burn off in the first stage of catalyst regeneration was simulated by treating a sample of 2 g Catalyst A with 10% $O_2$ and 3% $H_2O$ at a flow rate of 500 ml/min in a reactor at atmospheric pressure of 510° C. for 2 hours. The deactivated catalyst was then oxychlorinated using conventional conditions. Thus, the catalyst was treated with 0.35% HCl, 10% $O_2$ and 3% $H_2O$ at a flow rate of 500 ml/min at 510° C. for 5 hours. The flow of HCl was stopped and the catalyst stabilized by treatment with 10% $O_2$ and 3% water for 1 hour. After this the catalyst was reduced with 10% $H_2$ and 3% $H_2O$ at a flow rate of 500 ml/min for 2 hours at 510° C. The resulting comparative catalyst is designated as Catalyst B.

The deactivation and reactivation of a further sample of 2 g Catalyst A was repeated as for Catalyst B except that $CO_2$ was introduced into the reactor during the deactivation step and the flow of $CO_2$ was continued throughout the oxychlorination step and the subsequent oxygen stabilization step, after which it was stopped. The $CO_2$ was fed into the reactor with the other gases and the concentration of $CO_2$ was maintained at 4% (4 kPa partial pressure). In addition the oxychlorination time was 2 ½ hours and the subsequent stabilization and reduction were carried out at 350° C. The $CO_2$ was purged from the reactor, using an inert gas flow, before the reduction step. The resulting catalyst is designated as Catalyst C.

The performance of Catalysts A, B and C were each evaluated by measuring the yield of benzene produced from a reforming process with 3-methylpentane. The reforming was carried out at a $H_2$/3-methylpentane ratio of 6, a space velocity of 20 w/w/hour, a temperature of 510° C. and a pressure of 105 psig. The results are given in Table 1.

TABLE 1

| Catalyst | Benzene Yield Weight % | |
|---|---|---|
| | After 5 Hrs. On Oil | After 10 Hrs. On Oil |
| A (fresh) | 19.6 | 15.2 |
| B (comparative) | 18.1 | 12.6 |
| C (with $CO_2$) | 22.9 | 17.8 |

The results show that when the catalyst is regenerated under normal conditions, as in Catalyst B, then the activity of the catalyst towards the production of aromatics falls below that of the fresh catalyst (Catalyst A) especially after a number of hours have elapsed. However, if the catalyst is treated with $CO_2$ during the oxychlorination step, as in Catalyst C, then the activity of the catalyst is greatly improved, in this instance even surpassing that of the fresh, untreated catalyst.

EXAMPLE 2

A sample of a PT/KL zeolite catalyst was discharged from a reforming reactor. The catalyst comprised 0.64% platinum on KL zeolite extrudates, the platinum having been loaded on to the zeolite at a pH of 11 to 12. The catalyst had been on oil (i.e., had been used in the reforming process to convert naphtha) for more than 1000 hours and had been regenerated three times in situ using conventional regeneration methods. This used catalyst is designated as Catalyst D.

A sample of 2 g Catalyst D was regenerated in the same manner as described for Catalyst B in Example I except that the oxychlorination time was 2 ½ hours. The resulting comparative catalyst is designated as Catalyst E.

A further sample of 2 g Catalyst D was regenerated in the same manner as described for Catalyst C in Example 1, except that the flow of $CO_2$ was stopped when the flow of HCl was stopped, and the oxygen stabilization and hydrogen reduction steps were carried out in the absence of $CO_2$ at 510° C. The resulting catalyst is designated as Catalyst F.

The performance of Catalyst D, E, F and a sample of the fresh commercial catalyst, designated Catalyst $D^1$, were evaluated with a 3-methylpentane reforming process as described in Example 1. The results are given in Table 2.

TABLE 2

| Catalyst | Benzene Yield Weight % | |
|---|---|---|
| | After 5 Hrs. On Oil | After 10 Hrs. On Oil |
| D (used) | 13.7 | 10.0 |
| E (comparative) | 20.2 | 15.8 |
| F (with $CO_2$) | 23.0 | 17.0 |
| $D^1$ (fresh) | 22.1 | 18.9 |

The results show that the used Catalyst D is considerably deactivated compared to the fresh Catalyst $D^1$. The catalyst regenerated under normal conditions, comparative Catalyst E, has been reactivated to some extent, but a substantial improvement is obtained when the catalyst has been reactivated in the presence of $CO_2$.

EXAMPLE 3

A PT/KL zeolite catalyst was synthesized as described in Example 1 except that the platinum was loaded on to the zeolite extrudates at a pH of 8.75. This catalyst is designated as Catalyst G.

A sample of Catalyst G was deactivated and then reactivated in the same manner as for Catalyst B in Example 1, except that the gas stream in the deactivation step also contained 10% $CO_2$ (10 kPa partial pressure). The $CO_2$ was purged from the reactor before the oxychlorination step. This catalyst is designated as Catalyst H.

A further sample of Catalyst G was deactivated and then reactivated in the same manner as for Catalyst F in Example 2. This catalyst is designated as Catalyst I.

The performance of Catalysts G, H and I was evaluated with a 3-methylpentane reforming process as described in Example 1, and the results are given in Table 3.

TABLE 3

| Catalyst | Benzene Yield Weight % | |
|---|---|---|
| | After 5 Hrs. On Oil | After 10 Hrs. On Oil |
| G (fresh) | 14.2 | 9.6 |
| H (comparative) | 14.8 | 10.4 |
| I (with $CO_2$) | 20.0 | 15.4 |

The results show a very substantial improvement in catalytic performance when $CO_2$ is present in the oxychlorination step, but not when $CO_2$ is present only in the deactivation (equivalent to coke burn off) step.

EXAMPLE 4

A PT/KL zeolite catalyst was synthesized as described in Example I except that the platinum was loaded on to the zeolite extrudates at a pH of 10.3. This catalyst is designated as Catalyst J.

2 grams of Catalyst J were deactivated and then reactivated in the same manner as for Catalyst B in Example 1. This catalyst is designated as Catalyst K.

A further sample of Catalyst J was deactivated and then reactivated in the same manner as for Catalyst F in Example 2. This catalyst is designated as Catalyst L.

The performance of Catalysts J, K and L was evaluated with a 3-methylpentane reforming process as described in Example 1, and the results are given in Table 4.

TABLE 4

| Catalyst | Benzene Yield Weight % | |
|---|---|---|
| | After 5 Hrs. On Oil | After 20 Hrs. On Oil |
| J (fresh) | 20.2 | 17.7 |
| K (comparative) | 21.8 | 16.6 |
| L (with $CO_2$) | 25.3 | 21.5 |

Again the results show a very substantial improvement in catalytic performance when $CO_2$ is present in the oxychlorination step. Additionally, transmission electron microscopy (TEM) indicated that both Catalysts K and L contained highly dispersed Pt clusters of the size of 6–10 Å. However, there was a distinct difference between these two catalysts. Platinum was detected on the $Al_2O_3$ binder of Catalyst K but was absent on the $Al_2O_3$ binder of Catalyst L. This suggests that the presence of $CO_2$ in the oxychlorination step reduces the interaction between the $Al_2O_3$ binder and platinum chloride species and as a result, redistribution of Pt to the $Al_2O_3$ binder during oxychlorination is minimized.

EXAMPLE 5

A sample of the fresh commercial catalyst (Catalyst $D^1$) of Example 2 was deactivated and then reactivated in the same manner as for Catalyst F in Example 2, i.e., including $CO_2$ in the deactivation and oxychlorination steps. This catalyst is designated as Catalyst M.

A further sample of Catalyst $D^1$ was deactivated and then reactivated as for Catalyst M except that 10% $CO_2$ (10 kPa partial pressure) was also included in the reduction step. This catalyst is designated as Catalyst N.

A further sample of Catalyst $D^1$ was deactivated and reactivated as for Catalyst E in Example 2, i.e., under normal conditions, except that 10% $CO_2$ (10 kPa partial pressure) was present in the reduction step. This catalyst is designated as Catalyst O.

A further sample of Catalyst $D^1$ was deactivated and reactivated as for Catalyst O except that the stabilization and reduction steps were each carried out at 350° C. This catalyst is designated as Catalyst P.

Finally Catalyst $D^1$ was reduced with 10% $H_2$, 3% $H_2O$ and 4% $CO_2$ (4 kPa partial pressure) at a temperature of 510° C. for 2 hours. This catalyst is designated as Catalyst Q.

The performances of the above catalysts were evaluated with a 3-methylpentane reforming process as described in Example 1 and the results are given in Table 5.

TABLE 5

| Catalyst | Benzene Yield Weight % | |
|---|---|---|
| | After 5 Hrs. On Oil | After 20 Hrs. On Oil |
| M | 22.7 | 18.7 |
| N | 2.5 | 2.0 |
| O | 0.9 | — |
| P | 2.6 | 2.0 |
| Q | 0.9 | — |
| $D^1$ | 22.1 | 18.9 |

The results show a substantial loss of catalyst performance if $CO_2$ is present in the reduction step, and the reduction temperature is between 350° and 510° C., regardless of the conditions of previous regeneration steps. TEM studies of Catalysts N and O indicated the presence of platinum agglomerates of the size 10 to 30Å.

EXAMPLE 6

3 grams of the fresh Catalyst $D^1$ of Example 2 was heated to 510° C. in 10 vol% $O_2$ in helium at a flow rate of 500 ml/min. After the catalyst reached 510° C,. $CO_2$ was added to the gas stream to give 1 vol% $CO_2$ (1 kPa partial pressure) and after 5 minutes oxygen was shut off. The remaining oxygen was purged out of the reactor by the 1 vol% $CO_2$ in helium at 500 ml/min for 10 minutes. Then hydrogen was added to give 10 vol% $H_2$ keeping the total flow at 500 ml/min. This treatment was continued for 1.5 hours. This Catalyst is designated as Catalyst R.

Another 2 grams of Catalyst $D^1$ of Example 2 were heated to 400° C. in 10 vol% $O_2$ in helium at a flow rate of 500 ml/min. After the catalyst reached 400° C., $CO_2$ and water were added to the gas stream to give 0.2 vol% $CO_2$ (0.2 kPa partial pressure) and 3 vol% water respectively. The temperature was then raised to 510° C. The catalyst was treated under the above gas mixture for 35 minutes before oxygen was shut off. The remaining oxygen was purged out of the reactor for 10 minutes before hydrogen was added to give 10 vol% hydrogen. The reduction was carried out for 1.5 hours. This catalyst is designated as Catalyst S.

Another 3 grams of Catalyst $D^1$ of Example 2 were first reduced at 510° C. with 10 vol% hydrogen in helium at a flow rate of 500 ml/min. for 1 hour. Then $CO_2$ was added to give 0.05 vol% (0.05 kPa partial pressure), and this treatment continued for 1.5 hours. This catalyst is designated as Catalyst T.

Another 2 grams of Catalyst $D^1$ of Example 2 were treated with the same procedure as Catalyst T except that in the $H_2$ and $CO_2$ step, $CO_2$ was at 0.025 vol% (0.025 kPa partial pressure) and the gas flow rate was at 1000 ml/min. This catalyst is designated as Catalyst U.

The performance of Catalysts R, S, T and U was evaluated with a 3-methylpentane reforming process as described in Example 1, and the results are given in Table 6.

TABLE 6

| Catalyst | Vol % $CO_2$ in Hydrogen | Benzene Yield Weight % | |
|---|---|---|---|
| | | After 5 Hrs. On Oil | After 20 Hrs. On Oil |
| $D^1$ (fresh) | 0 | 22.1 | 18.9 |
| R | 1 | 5.8 | 4.7 |
| S | 0.2 | 10.4 | 9.15 |
| T | 0.05 | 18 | 16.1 |
| U | 0.025 | 20 | 18.1 |

The results again show that $CO_2$ is harmful to the catalyst when it is present in the reduction step of the Pt/KL-zeolite catalysts. TEM studies of Catalyst S indicated platinum particles were agglomerated with cluster size of 10–25 Å. There is still a slight activity loss even at 0.025 vol% (0.025 kPa partial pressure) although this level of loss is more acceptable. The above results also indicate that exposing a prereduced catalyst to $CO_2$ containing hydrogen will still lead to catalyst deactivation (Catalyst T and U). Therefore, after catalyst regeneration $CO_2$ should be purged to a low level before hydrogen reduction. Excluding $CO_2$ in the treat gas is also important in the activation of a fresh catalyst.

EXAMPLE 7

2 grams of the fresh Catalyst $D^1$ of Example 2 was heated to 200° C. in helium at a flow rate of 500 ml/min. The catalyst was dried under these conditions for 1 hour. The temperature of the catalyst was then increased to 350° C. Hydrogen was added to give 10 vol%. The catalyst was reduced for 1.5 hours. Then CO was added to the gas mixture to give 0.5 vol% CO (0.5 kPa partial pressure). This treatment was continued for 1.5 hours. CO was shut off and was stripped from the catalyst by 10 vol% hydrogen at 350° C. for 1.5 hours. This catalyst is designed as Catalyst V.

Another 2 grams of Catalyst $D^1$ of Example 2 were treated in the same manner as Catalyst V except that the CO concentration was 0.1 vol% (0.1 kPa partial pressure) and the gas flow rate in the $H_2$ and CO step was at 1000 ml/min. This catalyst is designated as Catalyst W.

Another 2 grams of Catalyst $D^1$ of Example 2 were heated up to 400° C. in 10 vol% $O_2$ in helium at a flow rate of 500 ml/min. After one hour at 400° C. the temperature of the catalyst was increased to 510° C. Oxygen was purged out for 10 minutes before CO was added to give 0.1 vol% (0.2 kPa partial pressure). Then hydrogen was added to give 10 vol%. This treatment was continued for 1.5 hours. This catalyst is designated Catalyst X.

The performance of Catalyst V, W and X was evaluated with a 3-methylpentane reforming process as described in Example 1, and the results are given in Table 7.

TABLE 7

| Catalyst | Vol % $CO_2$ in $H_2$ at Temp. | Benzene Yield Weight % After 5 Hrs. On Oil | After 20 Hrs. On Oil |
| --- | --- | --- | --- |
| $D^1$ (fresh) | 0 | 22.1 | 18.9 |
| V | 0.5 (350° C.) | 15 | 13.3 |
| W | 0.1 (350° C.) | 16.9 | 15.2 |
| X | 0.1 (510° C.) | 12.6 | 10 |

The results indicate that CO present in the hydrogen reduction step deactivates the catalysts in the temperature range 350°–510° C. A catalyst suffers more deactivation when the $H_2$ and CO treatment is at higher temperature (comparing Catalyst X and W). A reduced catalyst when it is exposed to $H_2$ and CO is also deactivated (Catalyst V and W). TEM studies of Catalyst X indicate platinum particles were agglomerated and particle sizes up to 40 Å were observed. Therefore, in the reduction of a fresh catalyst CO should be purged to a low level and the gas stream has to be CO free.

EXAMPLE 8

3 grams of Catalyst $D^1$ of Example 2 were heated to 200° C. in helium at a flow rate of 500 ml/min. The catalyst was dried under this condition for 1 hour. Oxygen was added to give 10 vol% and the temperature of the catalyst was raised to 510° C. Then the oxygen was shut off and was purged out of the reactor with helium for 10 minutes. $CO_2$ was added to the gas stream to give 1 vol% $CO_2$ (1 kPa partial pressure). This treatment was continued for 1.5 hours. This catalyst is designated as Catalyst Y.

2 grams of Catalyst $D^1$ of Example 2 were heated to 350° C. in 10 vol% $O_2$ in helium at a flow rate of 500 ml/min. The catalyst was treated under these conditions for 20 minutes. Then the oxygen was shut off and was purged out of the reactor with helium for 30 minutes. $CO_2$ was added to the gas stream to give 1 vol% (1 kPa partial pressure). This treatment was continued for 1.5 hours. This catalyst is designated as Catalyst Z.

2 grams of Catalyst $D^1$ of Example 2 were heated to 200° C. in helium at a flow rate of 500 ml/min. The catalyst was dried under these conditions for 1 hour. Hydrogen was added to the gas stream to give 10 vol% $H_2$. The reduction was carried out for 1.5 hours. Hydrogen was then shut off and was purged out of the reactor with helium for 1 hour. CO was added to the gas stream to give 0.5 vol% CO (0.5 kPa partial pressure). This treatment was continued for 1.5 hours. This Catalyst is designated as Catalyst AA.

2 grams of Catalyst $D^1$ in Example 2 were treated as Catalyst AA except that the CO concentration was 0.1 vol% (0.1 kPa partial pressure) with a gas flow rate of 1000 ml/min. This catalyst was designated as Catalyst BB.

The performance of Catalyst Z, AA and BB was evaluated with a 3-methylpentane reforming process as described in Example 1, and the results are given in Table 8.

TABLE 8

| Catalyst | Vol % $CO_x$ in He at Temp. | Benzene Yield Weight % After 5 Hrs. On Oil | After 20 Hrs. On Oil |
| --- | --- | --- | --- |
| $D^1$ (fresh) | 0 | 22.1 | 18.9 |
| Y | 1 (510° C.) | 13.5 | 11.9 |
| Z | 1 (350° C.) | 21.8 | 19 |
| AA | 0.5 (350° C.) | 16.4 | 14.3 |
| BB | 0.1 (350° C.) | 17.5 | 15.2 |

The results indicate that at low temperature (350° C.) exposing the catalyst to $CO_2$ in the absence of hydrogen does not result in catalyst deactivation (Catalyst Z). However, when the exposure temperature is raised to 510° C. significant catalyst deactivation occurs (Catalyst Y). In contrast, exposing the reduced catalyst to CO at low temperature (350° C.) in the absence of hydrogen still results in catalyst deactivation.

EXAMPLE 9

4 grams of a reforming catalyst obtained from Ketjen containing 0.6 wt% Pt in 1/16" $Al_2O_3$ extrudates (Catalyst CC) were heated to 510° C. under 20 vol% $O_2$ in helium at a flow rate of 500 ml/min. The catalyst was treated under this condition for 1 hour. Oxygen was shut off and was purged from the reactor by helium for 10 minutes. CO and $H_2$ were added to the gas stream to give 4 vol% CO (4 kPa partial pressure) and 20 vol% $H_2$. This treatment lasted for 2 hours. This catalyst is designated as Catalyst DD.

The fresh Catalyst CC and 'used' Catalyst DD were evaluated by hydrogen chemisorption to measure the dispersion of the Pt particles. These two catalysts were first reduced at 475° C. in 100 vol% hydrogen at a flow rate of 1000 ml/min for 2 hours. Then they were evacuated at 450° C. for 1 hour. Hydrogen chemisorption was carried out at 35° C. The detailed operation and apparatus used in hydrogen chemisorption can be obtained from J. Am. Chem. Soc. 100, 170 (1978) by S. J. Tauster, S. C. Fung and R. L. Garten. This technique provides a measurement on the volume of hydrogen irreversibly adsorbed by one gram of catalyst. From this, an atomic ratio of hydrogen atoms to metal atoms H/Pt, can be calculated. The results are in Table 9.

TABLE 9

| Catalyst | H/PT |
|---|---|
| CC (fresh) | 0.7 |
| DD (CO in $H_2$) | 0.44 |

The results indicate that exposure of the catalyst to CO in the reduction step also deactivates $Pt/Al_2O_3$ catalysts. The lower H/Pt ratio suggests that less Pt atoms are surface atoms and that the Pt clusters have increased in size.

What is claimed is:

1. A method of treating a Group VIII noble metal-containing catalyst selected from the group consisting of fresh catalysts and coke-contaminated catalysts comprising the steps of:
   (a) removing substantially all of the coke from said Group VIII noble metal-containing catalyst when said catalyst is a coke-contaminated catalyst;
   (b) redispersing the noble metal(s), the redispersion being carried out by contacting the Group VIII noble metal-containing catalyst in a reaction-vessel with a halogen or halide-containing gas with a source of oxygen present, and carbon dioxide, the amount of carbon dioxide being maintained at a partial pressure of at least 2 kPa in the reaction vessel substantially throughout the period in which the catalyst is in contact with the halogen or halide containing gas;
   (c) stabilizing the Group VIII noble metal-containing catalyst by treatment with an inert or oxygen containing gas;
   (d) substantially removing carbon dioxide and carbon monoxide so that the amount of carbon dioxide and carbon monoxide in the reaction vessel during the chemical reduction step (e) is less than 0.05 kPa partial pressure;
   (e) chemically reducing the Group VIII noble metal-containing catalyst.

2. The method according to claim 1 wherein said halogen or halide-containing gas is selected from the group consisting of chlorine, hydrogen chloride, and mixtures thereof.

3. A method according to claim 1 wherein said chemical reduction step (e) comprises hydrogen reduction.

4. A method according to claim 1 wherein said Group VIII noble metal-containing catalyst comprises a Group VIII noble metal and a support selected from the group consisting of zeolites, inorganic oxides, clays and mixtures thereof.

5. A method according to claim 4 wherein said Group VIII noble metal-containing catalyst further comprises a binder selected from the group consisting of alumina, silica and clay.

6. A method according to claim 1 wherein said Group VIII noble metal-containing catalyst further comprises rhenium.

7. A method according to claim 1 wherein said Group VIII noble metal is selected from the group consisting of osmium, ruthenium, rhodium, iridium, palladium, platinum and mixtures thereof.

8. A method according to claim 1 wherein the amount of carbon dioxide present during step (b) is maintained at a partial pressure from 2 kPa to 35 kPa in the reaction vessel.

9. A method according to claim 1 wherein the carbon dioxide is input into the reaction vessel in the form of carbon dioxide containing gas.

10. A method according to claim 9 wherein said carbon dioxide containing gas comprises carbon dioxide and an inert gas.

11. A method according to claim 1 wherein the contact of said Group VIII noble metal-containing catalyst with carbon dioxide gas is commenced at substantially the same time as the commencement of contact of the catalyst with the halogen or halide containing gas and is terminated at substantially the same time as the termination of the contact of the catalyst with halogen or halide containing gas.

12. A method according to claim 1 wherein the contact of said Group VIII noble metal-containing catalyst with carbon dioxide is maintained during the stabilization step (c), after which it is terminated.

13. A method according to claim 1 wherein said Group VIII noble metal-containing catalyst is also contacted with carbon dioxide during the coke removal step when said Group VIII noble metal-containing catalyst is a coke-contaminated catalyst.

14. A method according to claim 1 wherein the reaction vessel is purged with an inert gas before the chemical reduction step (e).

15. A method according to claim 1 wherein the reaction vessel is subjected to pressure-depressure cycles with an inert gas before the chemical reduction step (e) until the concentration of carbon dioxide and carbon monoxide gases is diluted to less than 0.05 kPa.

16. A method according to claim 5 wherein said Group VIII noble metal-containing catalyst comprises platinum, L zeolite, and a binder.

* * * * *